L. BECKER.
WASHING-MACHINE.

No. 175,906. Patented April 11, 1876.

WITNESSES:
W. W. Hollingsworth
Solon C. Kemon

INVENTOR:
Leander Becker
BY
ATTORNEYS.

UNITED STATES PATENT OFFICE.

LEANDER BECKER, OF YORK, PENNSYLVANIA, ASSIGNOR TO N. C. BAUGH-MAN, OF SAME PLACE.

IMPROVEMENT IN WASHING-MACHINES.

Specification forming part of Letters Patent No. 175,906, dated April 11, 1876; application filed October 15, 1875.

*To all whom it may concern:*

Be it known that I, LEANDER BECKER, of the city and county of York and State of Pennsylvania, have invented a new and Improved Washing-Machine; and I do hereby declare that the following is a full, clear, and exact description of the same, reference being had to the accompanying drawing forming a part of this specification, in which—

Figure 1:
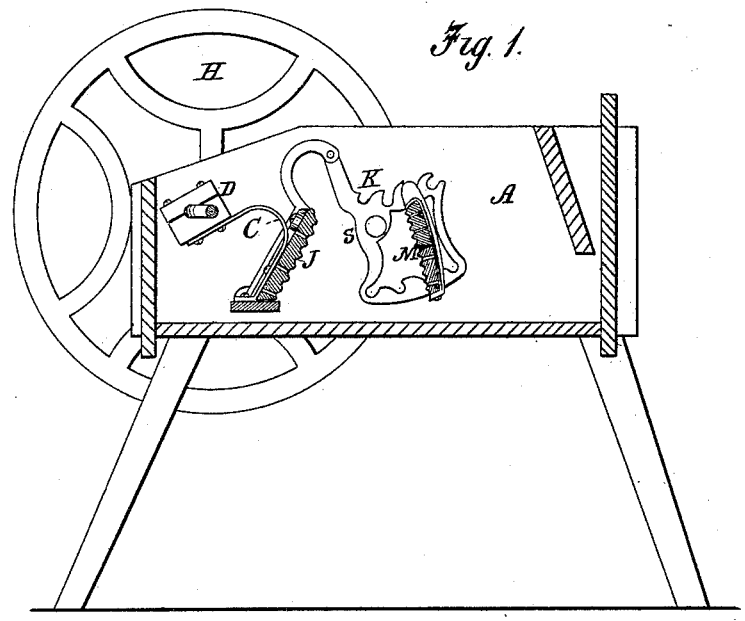
Figure 3:
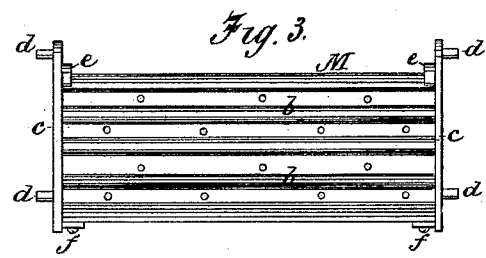
Figure 4:
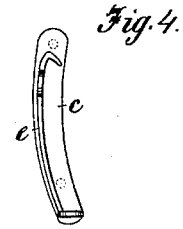
Figure 2:
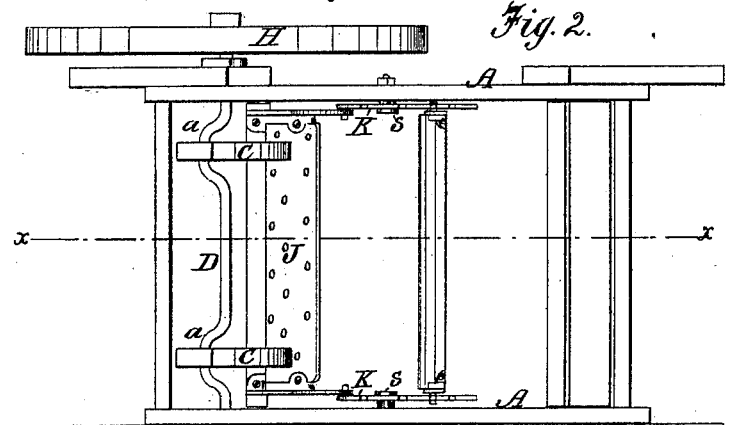
Figure 5:
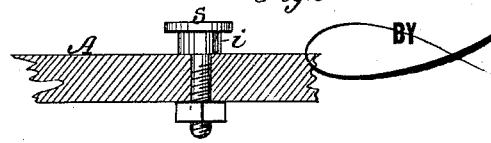

Figure 1 is a vertical longitudinal section; Fig. 2, a plan view; Fig. 3, detail of the detachable rubber; Fig 4, detail of end frame of rubbers; Fig 5, detail of pivot for oscillating levers.

This invention relates to certain improvements upon the patent granted me June 29, 1875, and numbered 165,058; and it consists in the particular construction of the rubber, as hereinafter more fully described.

In the drawing, A represents the body of the washer, and K the oscillating levers, which are provided with adjusting-seats for the detachable rubber M, which said casing and levers are of the same general construction as shown in my said previous patent. D is a crank-shaft, having a fly-wheel, H, attached, and a pinion, G, which is operated through the crank and gear wheel E. Said shaft D, instead of having a single crank, is provided with double cranks $a$ $a$, which impart motion to the stationary rubber J through the curved springs C, placed near each end. The object of said springs is to render the pressure of the rubber against the clothes elastic, so as to avoid wearing and tearing the same, and to make the machine when filled with clothes lighter running, and more uniform and regular in its motion. The clothes are contained in between the stationary rubber J and the adjustable rubber M, located in the adjusting-seats of the oscillating levers, and the mode of washing is in general the same as in my said previous patent. Instead, however, of constructing the rubbers of slats, I make them of wide boards or pieces $b$ $b$, corrugated or ribbed upon the inside and perforated with holes. These said pieces are secured in end frames $c$ $c$, which are provided with studs $d$ $d$ $d$ $d$, for supporting the rubber in the seats of the levers, the said end frames having also seats $e$ $e$, in which the boards $b$ are secured by screws $f$ $f$ passing through lugs. This gives me a substantial rubber which is durable and reliable, and in which the boards are quickly detachable when necessary to be replaced. S are specially-constructed pivots for supporting the oscillating levers. They consist simply of screw-threaded bolts, with a nut and head, and an enlarged portion, $i$, upon which the levers are pivoted, the object being to provide a pivot that is more durable and will stand more wear.

Having thus described my invention, what I claim as new is—

The rubber, consisting of the boards $b$ and end frames $c$, provided with studs $d$ and seats $e$, with lugs, having screw-holes, whereby the parts are fastened together, substantially as described.

LEANDER BECKER.

Witnesses:
SOLON C. KEMON,
EDWD. W. BYRN.